(12) United States Patent
Lamson et al.

(10) Patent No.: US 10,088,032 B2
(45) Date of Patent: Oct. 2, 2018

(54) LEAD SCREW NUT DEVICE

(71) Applicant: Haydon Kerk Motion Solutions, Inc., Waterbury, CT (US)

(72) Inventors: Jim Lamson, Milford, NH (US); Keith Knight, Milford, NH (US)

(73) Assignee: Haydon Kerk Motion Solutions, Inc., Waterbury, CT (US)

( * ) Notice: Subject to any disclaimer, the term of this patent is extended or adjusted under 35 U.S.C. 154(b) by 0 days.

(21) Appl. No.: 15/616,367

(22) Filed: Jun. 7, 2017

(65) Prior Publication Data

US 2017/0350493 A1  Dec. 7, 2017

Related U.S. Application Data

(60) Provisional application No. 62/346,844, filed on Jun. 7, 2016.

(51) Int. Cl.
| | |
|---|---|
| *F16C 27/06* | (2006.01) |
| *F16H 57/00* | (2012.01) |
| *F16H 25/24* | (2006.01) |

(52) U.S. Cl.
CPC ....... *F16H 57/0006* (2013.01); *F16C 27/063* (2013.01); *F16H 25/24* (2013.01)

(58) Field of Classification Search
CPC ........ F16C 27/063; F16C 27/08; F16H 25/20; F16H 25/24; F16H 25/2003; F16H 57/0006
See application file for complete search history.

(56) References Cited

U.S. PATENT DOCUMENTS

| | | | |
|---|---|---|---|
| 3,977,269 A | 8/1976 | Linley, Jr. | |
| 4,434,677 A * | 3/1984 | Linley, Jr. ................ | B23Q 5/40 74/409 |

(Continued)

FOREIGN PATENT DOCUMENTS

EP  1911658 A1  4/2008

OTHER PUBLICATIONS

Partial European Search Report, EP Application No. 17174741.3, dated Nov. 14, 2017, 13 pgs.

(Continued)

*Primary Examiner* — Phillip A Johnson
(74) *Attorney, Agent, or Firm* — Hamilton, Brook, Smith & Reynolds, P.C.

(57) ABSTRACT

A centralizing bushing assembly includes a bushing housing having axial ends and an opening extending therethrough along an axial axis. The opening can have a pocket extending outwardly from the axial axis within the bushing housing and have internal shoulders axially facing each other. A bushing ring can be positioned within the pocket of the bushing housing between the internal shoulders. The bushing ring can have a split for allowing collapsing of the bushing ring radially inward and have an inner diameter for slidably engaging an axially movable shaft extending through the bushing housing along the axial axis and also have an outer shoulder. A resilient biasing member can be positioned against the outer shoulder of the bushing ring for radially biasing the inner diameter of the bushing ring radially inwardly in a centralizing manner about the axial axis for engaging and centralizing the shaft slidably positioned therethrough.

18 Claims, 10 Drawing Sheets

(56) References Cited

U.S. PATENT DOCUMENTS

| | | | |
|---|---|---|---|
| 5,601,372 A | 2/1997 | Erikson et al. | |
| 6,099,166 A * | 8/2000 | Erikson | F16C 27/063 384/278 |
| 2004/0076353 A1 * | 4/2004 | Kubota | B62D 1/16 384/276 |
| 2010/0251839 A1 * | 10/2010 | Kim | B62D 3/12 74/29 |
| 2015/0204381 A1 * | 7/2015 | Zaike | F16C 27/063 384/202 |

OTHER PUBLICATIONS

European Search Report for International Application No. 17174741.3, entitled "Lead Screw Nut Device," published on Mar. 21, 2018.
Extended European Search Report for International Appl. No. 17174741.3, entitled "Lead Screw Nut Device," dated Feb. 18, 2016.

* cited by examiner

LEAD SCREW NUT DEVICE

RELATED APPLICATION(S)

This application claims the benefit of U.S. Provisional Application No. 62/346,844, filed on Jun. 7, 2016. The entire teachings of the above application are incorporated herein by reference.

BACKGROUND

Lead screw nut devices can have clearance between the threads of the nut and the lead screw, which can result in noise and positional precision issues.

SUMMARY OF THE INVENTION

The present invention can provide a centralizing bushing assembly which can be used with lead screw nut devices for centralizing the lead screw shaft and damping noise. The centralizing bushing assembly can include a bushing housing having axial ends and an opening extending therethrough along an axial axis. The opening can have a pocket or chamber extending outwardly from the axial axis within the bushing housing and have internal or inner shoulders or walls axially facing each other. A bushing or centralizer ring can be positioned within the pocket of the bushing housing between the internal shoulders. The bushing ring can have a split or gap for allowing collapsing of the bushing ring radially inward and have an inner diameter for slidably engaging an axially movable shaft extending through the bushing housing along the axial axis and also have an outer shoulder. A resilient biasing member can be positioned against the outer shoulder of the bushing ring for radially biasing the inner diameter of the bushing ring radially inwardly in a centralizing manner about the axial axis for engaging and centralizing the shaft slidably positioned therethrough.

In particular embodiments, the opening through the bushing housing can include a smaller diameter hole connected to the pocket which has a larger diameter. The resilient biasing member can be a resilient vibration damping O-ring. The pocket within the bushing housing can have an angled internal surface which biases the O-ring both radially inwardly and axially, for biasing the inner diameter of the bushing ring radially inwardly, and for biasing the bushing ring axially against one internal shoulder. A lead screw shaft can extend through the bushing housing and threadably engage a threaded lead nut within the smaller diameter hole. The bushing housing can be a nut body having a lead nut. The bushing ring can resiliently engage outer surfaces of the lead screw for centering the lead screw relative to the threaded nut for proper contact therebetween and damping noise. The pocket can be located at one axial end of the bushing housing. The bushing ring can include a radial flange extending radially outward from the outer shoulder at one axial end of the bushing ring for engaging against one internal shoulder of the bushing housing.

The present invention can also provide a centralizing lead screw bushing assembly including a bushing housing having axial ends and an opening extending therethrough along an axial axis. The opening can have a pocket or chamber extending outwardly from the axial axis within the bushing housing and have internal or inner shoulders or walls axially facing each other. A threaded nut can be axially adjacent to the pocket. A bushing or centralizer ring can be positioned within the pocket of the bushing housing between the internal shoulders. The bushing ring can have a split or gap for allowing collapsing of the bushing ring radially inward and have an inner diameter for slidably engaging an axially movable lead screw shaft extending through the bushing housing along the axial axis and also have an outer shoulder. A resilient biasing member can be positioned against the outer shoulder of the bushing ring for radially biasing the inner diameter of the bushing ring radially inwardly in a centralizing manner about the axial axis for engaging and centralizing the lead screw shaft slidably positioned therethrough for centering the lead screw shaft relative to the threaded nut for proper contact therebetween and damping noise.

In particular embodiments, the resilient biasing member can be a resilient vibration damping O-ring. The pocket within the bushing housing can have an angled internal surface which biases the O-ring both radially inwardly and axially, for biasing the inner diameter of the bushing ring radially inwardly, and for biasing the bushing ring axially against one internal shoulder.

The present invention can also provide a method of centralizing an axially movable shaft extending within a centralizing bushing assembly. The bushing assembly can include a bushing housing having axial ends and an opening extending therethrough along an axial axis. The opening can have a pocket extending outwardly from the axial axis within the bushing housing and have internal shoulders facing each other. A bushing ring can be positioned within the pocket of the bushing housing between the internal shoulders. The bushing ring can have a split for collapsing of the bushing ring radially inwardly, an inner diameter and an outer shoulder. The axially movable shaft extending through the bushing housing along the axial axis can be slidably engaged by the inner diameter of the bushing ring. The inner diameter of the bushing ring can be resiliently biased radially inwardly against the shaft in a centralizing manner about the axial axis with a resilient biasing member positioned against the outer shoulder of the bushing ring, thereby centralizing the shaft.

In particular embodiments, the opening through the bushing housing can include a smaller diameter hole connected to the pocket which has a larger diameter. The resilient biasing member can be a resilient O-ring. The pocket within the bushing housing can have an angled internal surface. The O-ring can be biased both radially inwardly and axially with the angled surface for biasing the inner diameter of the bushing ring radially inwardly and for biasing the bushing ring axially against one internal shoulder. The shaft can be a lead screw extending through the bushing housing and threadably engaging a threaded nut within the smaller diameter hole. Outer surfaces of the lead screw can be resiliently engaged by the bushing ring for centering the lead screw relative to the threaded nut for proper contact therebetween and damping noise. The pocket can be located at one axial end of the bushing housing. The bushing ring can include a radial flange extending radially outward from the outer shoulder at one axial end of the bushing ring for engaging against one internal shoulder of the bushing housing.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
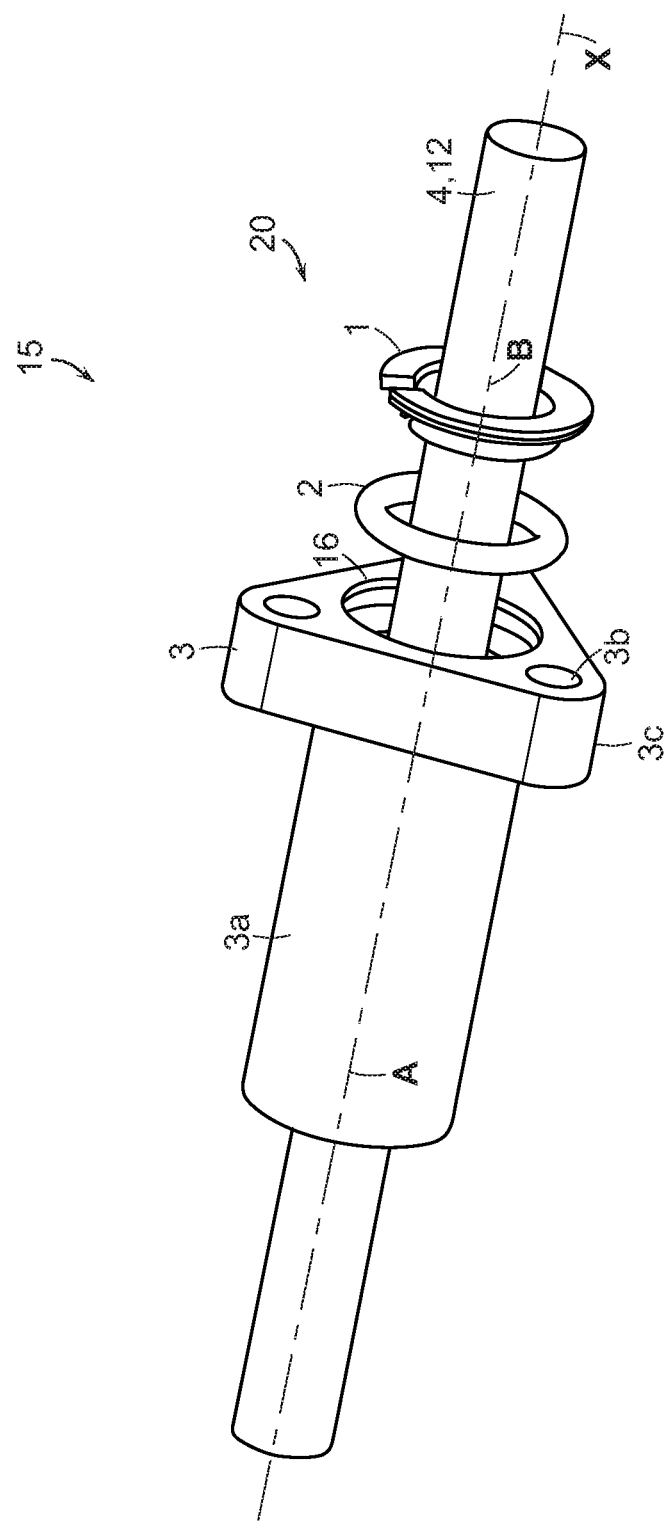
FIG. 1 is an exploded perspective view of an embodiment of a centralizing bushing assembly or lead screw nut device in the present invention.
Figure 2:
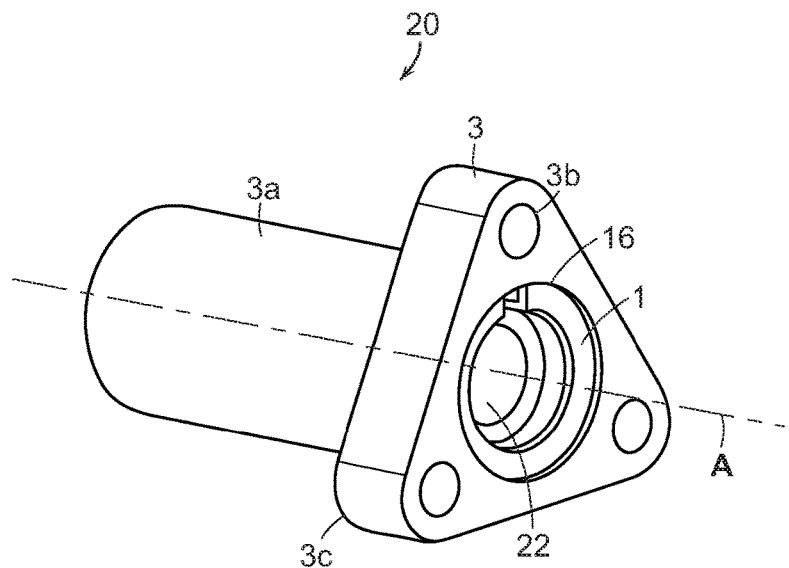
FIG. 2 is a perspective view of a bushing or nut assembly.
Figure 3:
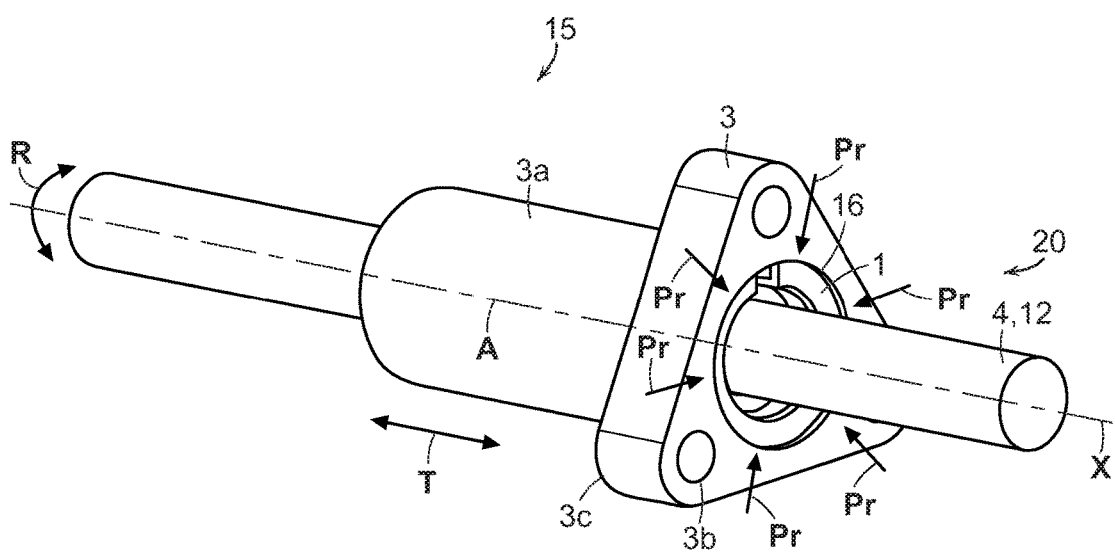
FIG. 3 is a perspective view of the lead nut screw device of FIG. 1.
Figure 4:
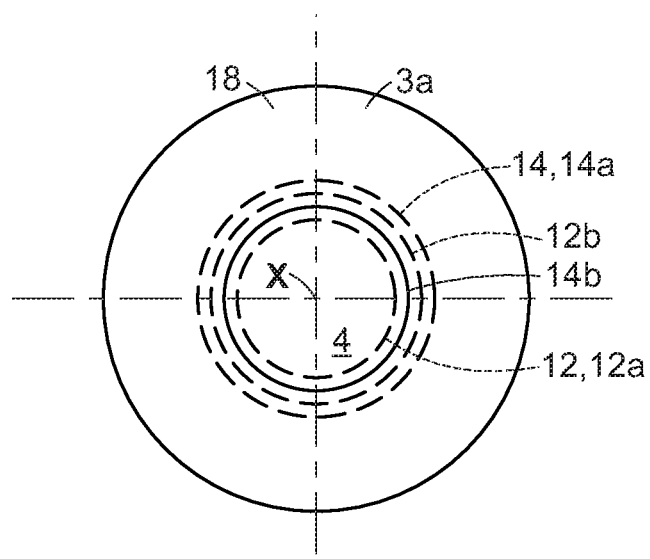
FIG. 4 is a schematic cross-sectional view of a threaded nut and lead screw shaft.
Figure 5:
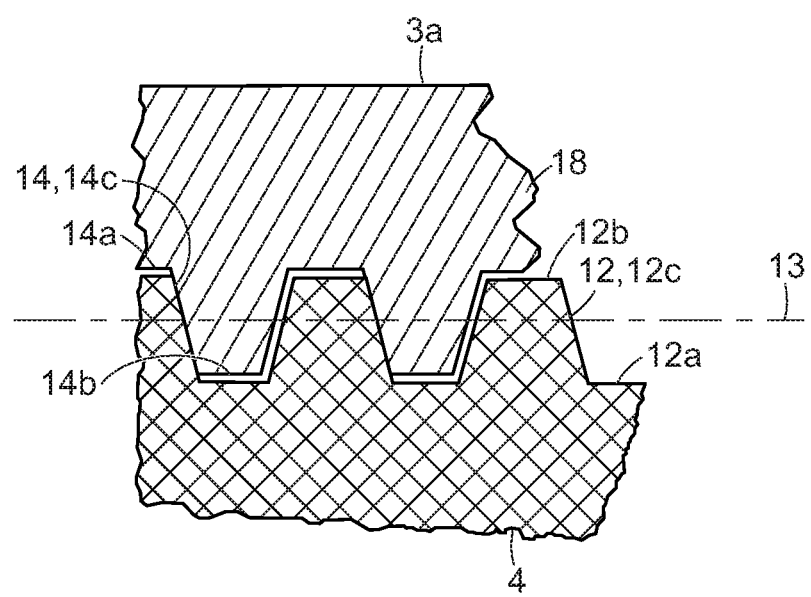
FIG. 5 is a sectional view of a portion of a threaded nut and lead screw shaft showing thread engagement.
Figure 6:
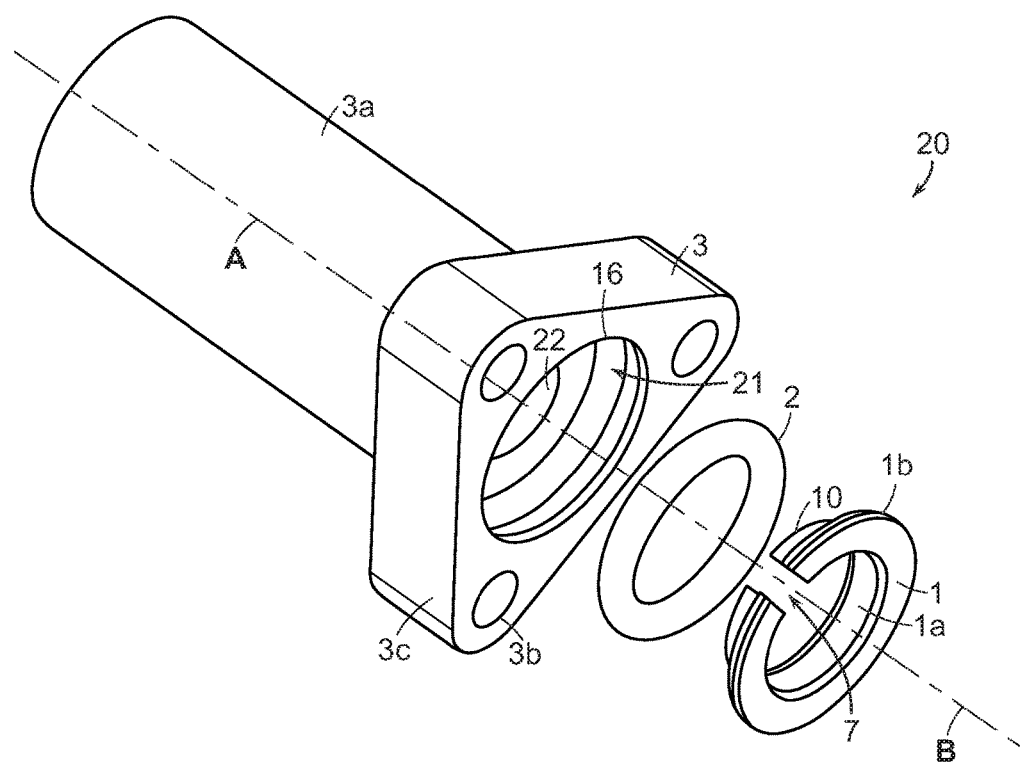
FIG. 6 is an exploded perspective view of a bushing or nut assembly.

A description of example embodiments follows.

Referring to FIGS. 1-10, an embodiment of a centralizing and noise damping linear motion bushing or lead screw nut arrangement, mechanism, assembly or device 15 in the present invention, can include a bushing or nut assembly 20 that can be slidably and/or drivably mounted on a shaft such as a threaded lead screw shaft 4 along an axial or longitudinal axis X. The lead screw shaft 4 can be coupled to a motor as known in the art (not shown) and rotated in the clockwise or counterclockwise directions indicated by arrows R (FIGS. 3 and 7) to translate the bushing or nut assembly 20 along the longitudinal axis X forwards or backwards as indicated by arrows T. The bushing or nut assembly 20 can include a bushing housing 3 having an opening 21 extending therethrough along an axial axis A for alignment along axis X. The housing 3 can have a smaller size or diameter opening or hole 22 through an elongate section 3a which can include a female threaded portion or nut 18 having threads 14 for engaging the male threads 12 of the lead screw shaft 4. The smaller diameter hole 22 can be connected to a centralizer pocket 16 having a larger size or diameter hole, and which is located in a flange 3c portion that is connected to elongate section 3a. A collapsible bushing or centralizing or centralizer member or ring 1 and an assembled compliant, deformable, flexible or resilient biasing annular member or O-ring 2, can be trapped, locked or positioned within the pocket 16 for slidably centralizing the lead screw shaft 4 (and axis X) relative to the smaller diameter hole 22 and axis A of housing 3, as well as threaded nut 18 and threads 14, thereby providing more precise linear movement and positioning of nut assembly 20, while also providing damping or noise and vibration reduction during operation. Mounting holes 3b within the flange 3c of housing 3 can allow the nut assembly 20 to be secured to desired components to be moved.

The centralizing ring 1 can be a spring or springlike generally annular member that is radially deformable, flexible or resilient, and includes a central opening or hole 30 (FIGS. 9 and 10) with a smooth curved inner surface, arc or diameter 1a. A radial split or gap 7 through the centralizing ring 1 can allow radial contraction or deformation inwardly for slidably engaging or contacting the outer diameter or surface of the lead screw shaft 4 with radial pressure $P_r$ generally evenly radially, for centralizing or concentrically aligning the lead screw shaft 4 (and axis X) relative to the smaller diameter hole 22 and axis A of the bushing housing 3, as well as the threaded nut 18 and threads 14. The resilient O-ring 2 can be generally concentrically fitted over an axial protrusion or neck 10 that forms an outer shoulder of the centralizing ring 1, for resiliently, flexibly or compliantly biasing the centralizing ring 1 radially inward when the lead screw nut device 15 is assembled. In addition, since the O-ring 2 can be made of polymeric material, the O-ring 2 can provide noise and vibration damping to the lead screw nut device 15. By concentrically centering the lead screw shaft 4 with the nut 18, proper or optimum circular aligned contact along an optimum circular pitchline 13 can be made between the male threads 12 of the lead screw shaft 4 and the female threads 14 of the nut 18. The male threads 12 of the lead screw shaft 4 can have a minor diameter 12a (thread root), a major diameter 12b (thread peak) and flanks 12c. The female threads 14 of the nut 18 can have a major diameter 14a (thread root), a minor diameter 14b (thread peak) and flanks 14c. Centering the lead screw shaft 4 with the nut 18 during operation can allow for proper contact between the flank 12c of the threads 12 of the lead screw shaft 4 and the flank 14c of the threads 14 of the nut 18 along the circular pitchline 13. Clearances exist between the lead screw shaft 4 and the nut 18 to allow manufacturing variation, as well as size variation due to differing coefficients of thermal expansion between the lead screw shaft 4 and the nut 18 materials. Manufacturing clearances can result in undesirable noise and vibration as well as less precise linear movement or positioning during operation. The centering of the lead screw shaft 4 with the nut 18 can compensate for the clearances between the lead screw shaft 4 and the nut 18 so that the nut assembly 20 can be driven with smooth operationally consistent precision despite the clearances. The damping properties provided by the centralizer ring 1 with the polymeric O-ring 2, can dampen vibration and noise caused by friction between the lead screw shaft 4 and the nut 18, or the natural or resonant frequency of the lead screw nut device 15 due to the clearances between the lead screw shaft 4 and the nut 18. Vibration of the lead screw shaft 4 can be transferred to the contacting centralizing ring 1 and absorbed by the polymeric material of the O-ring 2. Centering can also result in less noise and vibration initially being made during operation, thereby also making the damping more effective.

Figure 7:
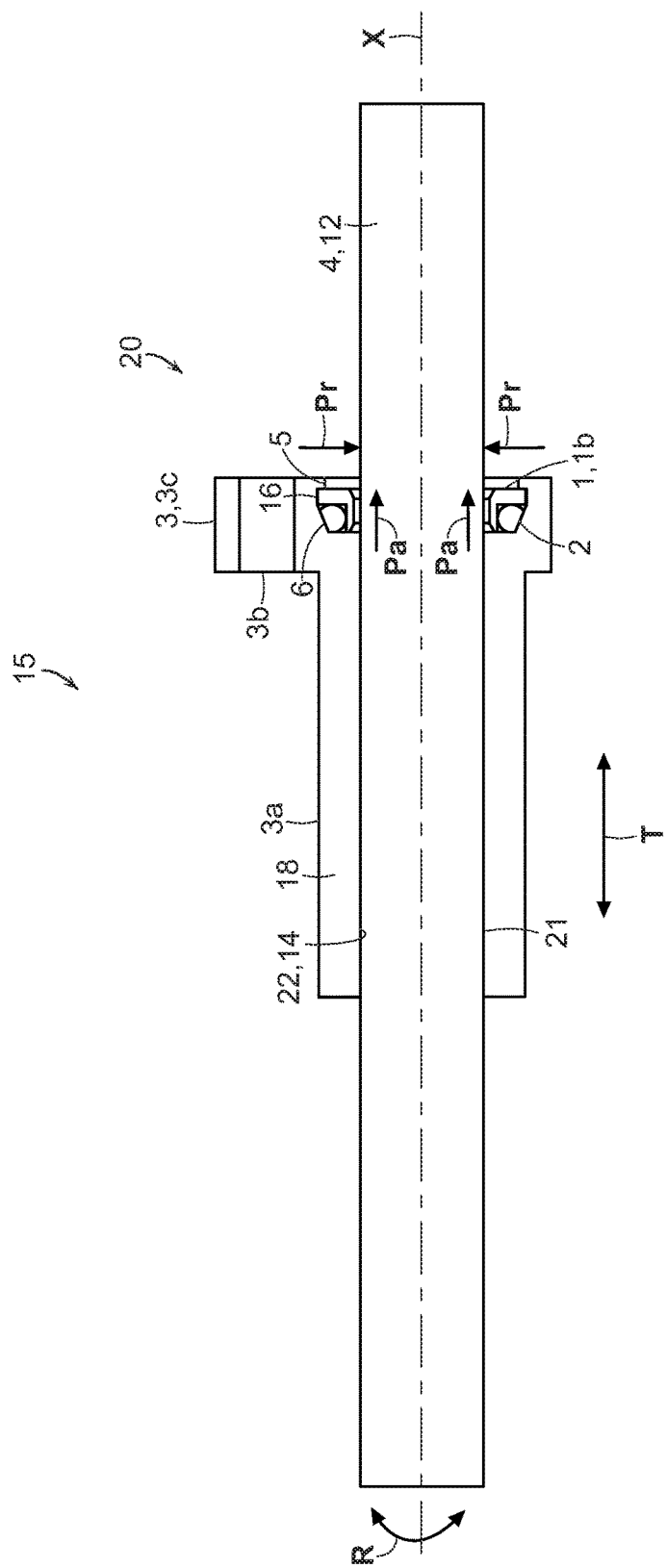
FIG. 7 is a schematic side sectional view of an embodiment of a lead screw nut device in the present invention.

Referring to FIG. 7, the O-ring 2 can act as both a spring and damper or damping member. When the centralizing ring 1, O-ring 2 and lead screw shaft 4 are assembled within the bushing housing 3, the pocket 16 can be sized and shaped to compress the O-ring 2 to apply radial pressure against the neck 10 or outer shoulder of the centralizing ring 1 until the inner surface 1a of the centralizer ring 1 engages and conforms to the surfaces or outer diameter of the lead screw shaft 4, thereby removing radial clearances. The O-ring 2 and centralizing ring 1 can resiliently adjust to different sizes of the lead screw shaft 4 and centralizing ring 1 caused by variations in manufacturing tolerances, as well as for any changes in size due to temperature changes or wear. The flexibility or resilience of the centralizing ring 1 material and the material or durometer of the O-ring 2 can be adjusted or chosen for specific application requirements, such as drag, temperature rating, radial load rating, etc. The O-ring 2 can be resilient, flexible or compliant, and can compressively deform or change shape to conform to the shape or geometry of the pocket 16 and the centralizing ring 1. The pocket 16 can be shaped and sized to have a geometry that compressively deforms the O-ring 2 to also exert axial pressure on the flange 3c of the centralizing ring 1 in addition to the radial pressure exerted on the neck 10 or outer shoulder of the centralizing ring 1. As a result, the combination of the pocket 16 geometry and the O-ring 2 can simultaneously cause the centralizer ring 1 to exert radial pressure $P_r$ concentrically on the lead screw shaft 4 and axial pressure $P_a$ against a retaining feature such as a radially inwardly extending internal shoulder, lip or circumferential ridge 5 of the pocket 16 at the axial end of the housing 3. This can seat the flange 1b axially against internal shoulder 5 in an axially locked or trapped manner within the pocket 16 and radially against the lead screw shaft 4.

Figure 8:
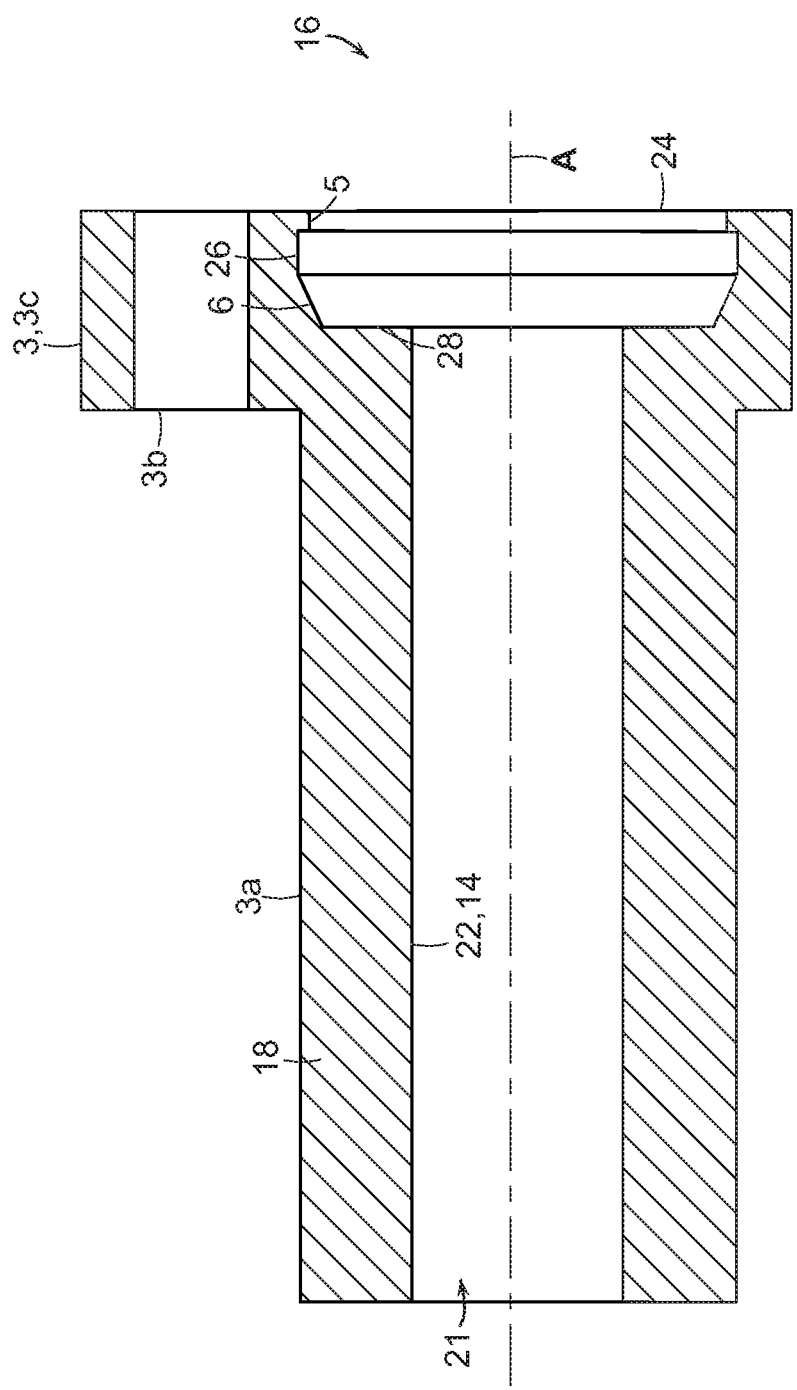
FIG. 8 is a schematic sectional view of an embodiment of a bushing housing in the present invention.

Referring to FIG. 8, the bushing housing 3 can have an elongate section 3a extending from one axial end in which the threaded nut 18 is formed therein or provided as an insert secured thereto. The threaded nut 18 can extend the length of the elongate section 3a and/or smaller diameter hole 22, or for only a portion thereof. The centralizer pocket 16 can be within the flange 3c at the other axial end of housing 3, concentric with and connected to the smaller hole 22 along axis A. The pocket 16 can be generally round or circular and can include a circular entrance opening 24, and the retaining feature or internal shoulder 5 at or near the axial end of the housing 3 can extend radially inwardly at the entrance opening 24 in a circular or annular manner. A circular or annular groove or recess 26 extending radially outwardly from axis A into housing 3 can be adjacent to the internal shoulder 5 axially inward thereof, which can transition to an axially adjacent circular or annular radially inwardly angled portion, ramp or surface 6 which terminates at an internal or inner end shoulder 28. The shoulder 28 can be circular or annular in shape and can be at the junction of the smaller diameter hole 22 with the larger diameter pocket 16. The pocket 16 can form a circular radial wedge shaped counter bore structure adjoining hole 22, having a ridge or internal shoulder 5 and an angled surface 6 and internal shoulder 28 at the axial ends. The centralizer ring 1 and O-ring 2 assembly can be concentrically contained or positioned within the pocket 16 axially trapped therein between the two opposed inner surfaces of the annular internal shoulders 5 and 28 that face each other, and the angled annular surface 6. Once the lead screw shaft 4 is positioned through housing 3 (FIG. 7), the centralizing ring 1 and O-ring 2 cannot be removed. In some embodiments, the internal shoulder 5 can be replaced with a snap ring that is fitted into a circumferential groove, which in some circumstances may allow removal of the centralizing ring 1 with the lead screw shaft 4 in place. The angled surface 6 can compress or deform O-ring 2 and apply both axial and radial pressure against O-ring 2 and the centralizer ring 1 to apply radial pressure $P_r$ on the lead screw shaft 4 with surface 1a, and axial pressure $P_a$ against the internal shoulder 5 with flange 1b. The angled surface 6 can in some embodiments have an angle relative to axis A of about 20° to 30°, such as 25°. In some embodiments, some radial pressure $P_r$ can be exerted by the radially inward facing surface or circumference of the recess 26. The threaded nut 18 can be formed of suitable materials as known in the art, such as metallic, polymeric or composite materials, and can be self-lubricating. The lead screw shaft 4 can also be formed of suitable materials known in the art such as steel or stainless steel.

Figure 10:
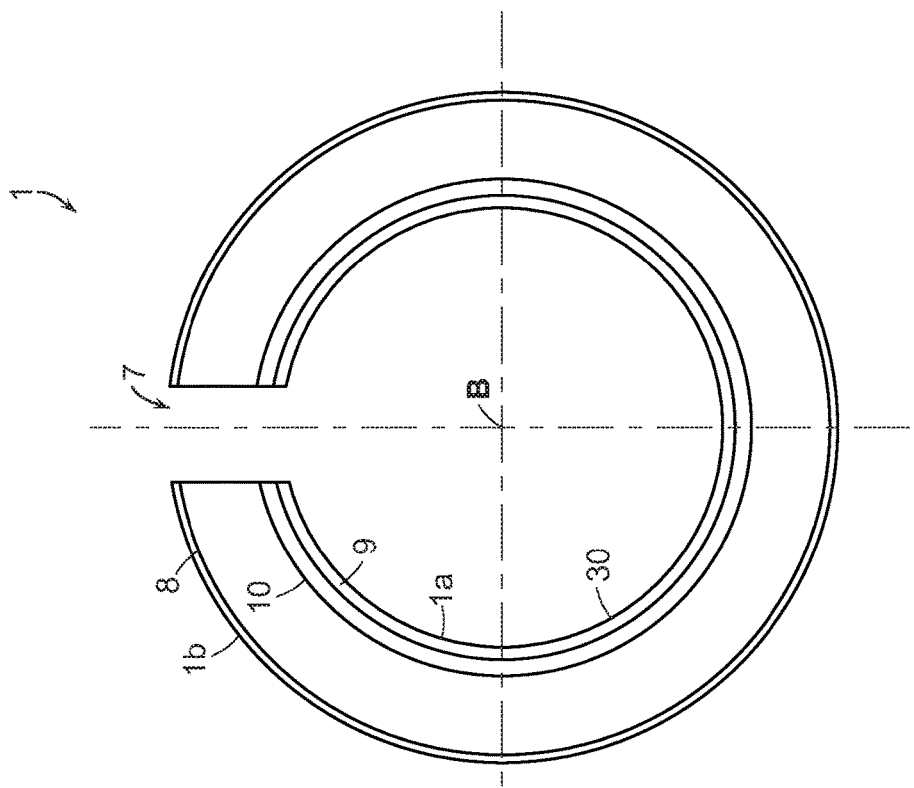
FIG. 10 is an end view of the bushing or centralizing ring of FIG. 9.
Figure 9:
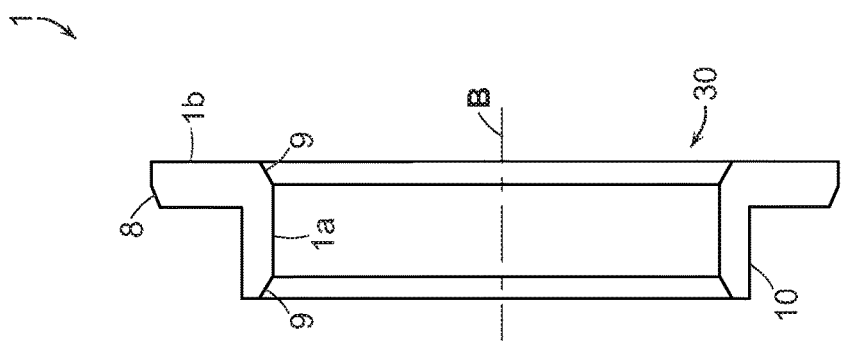
FIG. 9 is a sectional view of an embodiment of a bushing or centralizing ring in the present invention.
Figure 11:
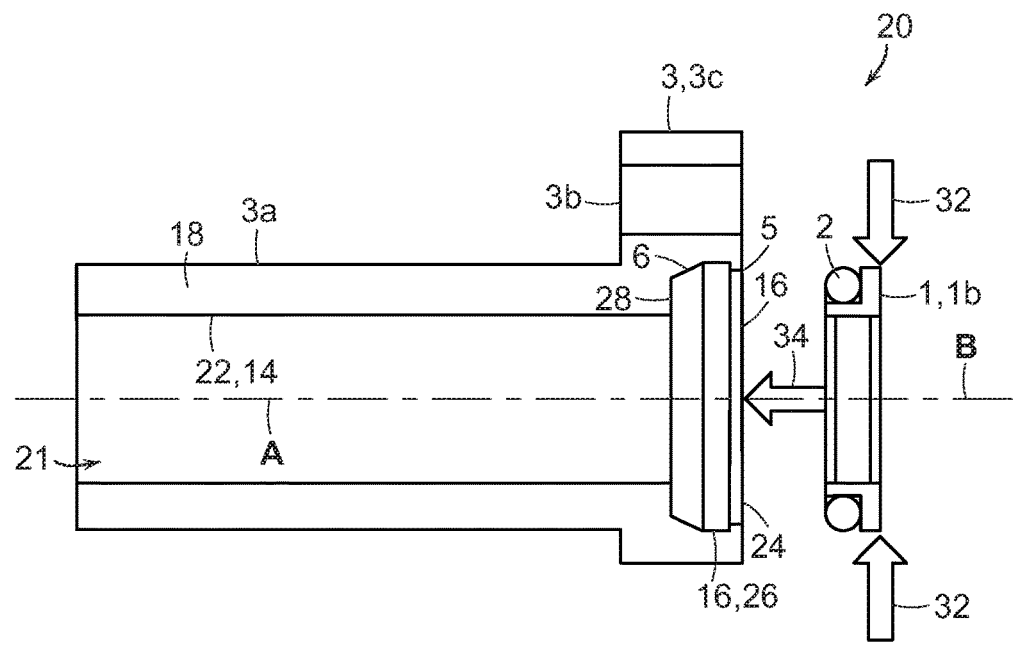
FIG. 11 is a schematic sectional view showing a bushing ring and O-ring assembly being inserted into a bushing housing.
Figure 12:
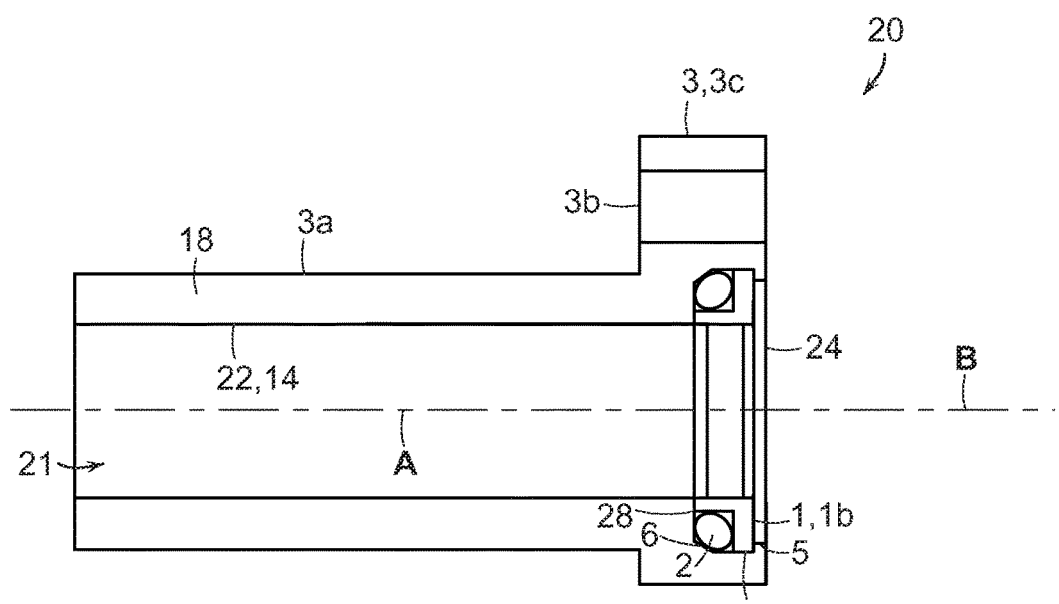
FIG. 12 is a schematic sectional view after insertion.

Referring to FIGS. 9 and 10, embodiments of the centralizing ring 1 can be generally circular or annular in shape. A central hole 30 can extend therethrough along axis B, that is bounded by inner surface 1a, and axially extends through a generally circular or annular neck 10 or outer shoulder. A generally circular or annular radial flange 1b extends radially outward from the neck 10 or outer shoulder. A split or gap 7 extends radially through the neck 10 and flange 1b. The gap 7 is wide or large enough to allow the centralizing ring 1 to collapse, bend, deform or deflect resiliently radially inwardly towards axis B to decrease in circumferential size or diameter to pass through the entrance opening 24 of pocket 16 for insertion thereof. The flange 1b can have a generally circumferential external chamfer or angled locating ramp 8 on the same side that neck 10 extends, for aiding in the insertion of the centralizing ring 1 through the entrance opening 24 of pocket 16 during assembly. Two generally internal chamfers or angled locating ramps 9 can be located at both axial ends of the inner surface 1a of hole 30, to aid in the insertion of lead screw shaft 4 through centralizing ring 1 and to help prevent jamming during assembly. The neck 10 can transmit radial force or pressure from O-ring 2 to the lead screw shaft 4, and prevents the O-ring 2 from contacting the lead screw shaft 4, which can damage the O-ring 2. Centralizing ring 1 can be made of various suitable materials, and can include metals, polymers and composites, including brass, bronze, nylon, acetal, carbon fiber composites, and self-lubricating materials. In some embodiments, the centralizing ring 1 is preferably made of acetal.

Referring to FIGS. 11-14, during assembly, the O-ring 2 is first assembled onto the neck 10 or outer shoulder of the centralizing ring 1. The O-ring 2 and centralizing ring 1 assembly is then radially collapsed inward with radial pressure or force as shown by the arrows 32. The inward pressure can be provided by hand or with a tool. In some embodiments, the O-ring 2 can be sized to provide some radial compression if desired. The O-ring 2 and centralizing ring 1 assembly is inserted into the pocket 16 of housing 3 through entrance opening 24 and past internal shoulder 5 as shown by arrow 34. Once past the internal shoulder 5, the inward radial pressure can be released which allows the centralizing ring 1 to resiliently expand radially outwardly in the pocket 16 in a springlike manner axially locking the O-ring 2 and centralizing ring 1 assembly into the pocket 16 between the shoulders 5, 28, surface 6 and recess 26.

Figure 13:
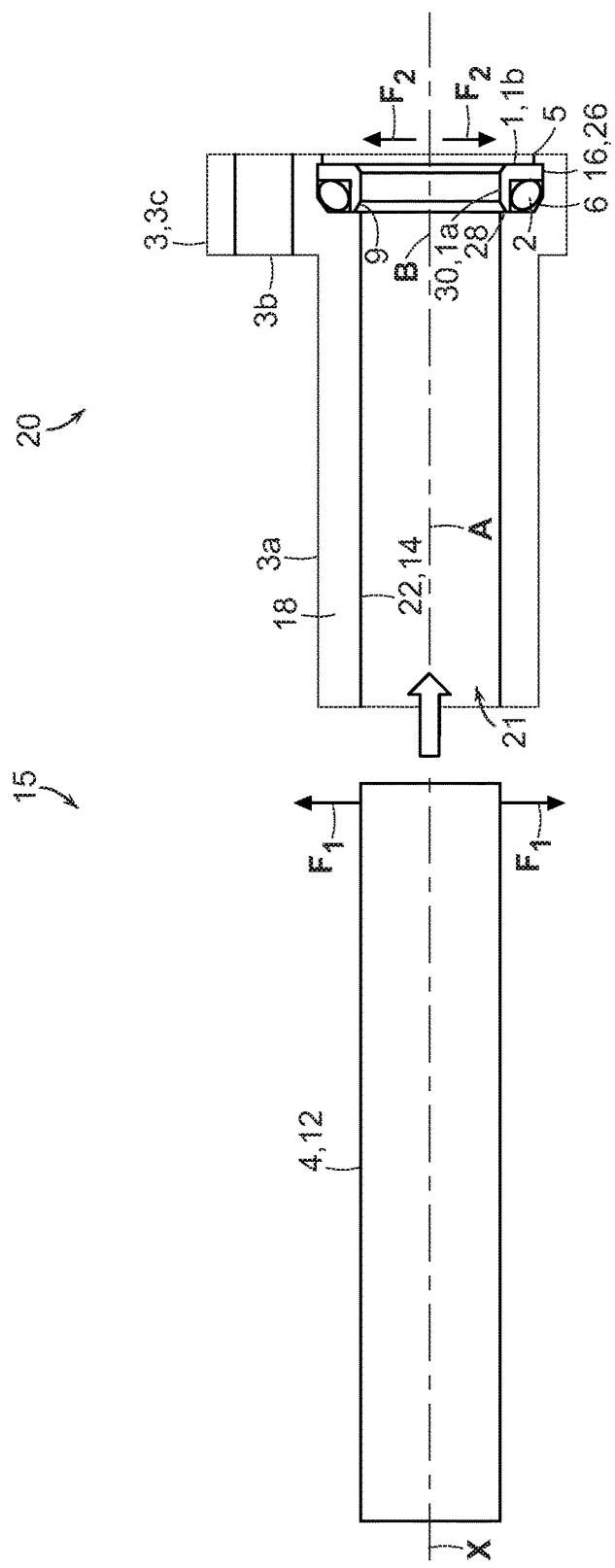
FIG. 13 is a schematic sectional view showing a lead screw shaft being inserted into a bushing or nut assembly.
Figure 14:
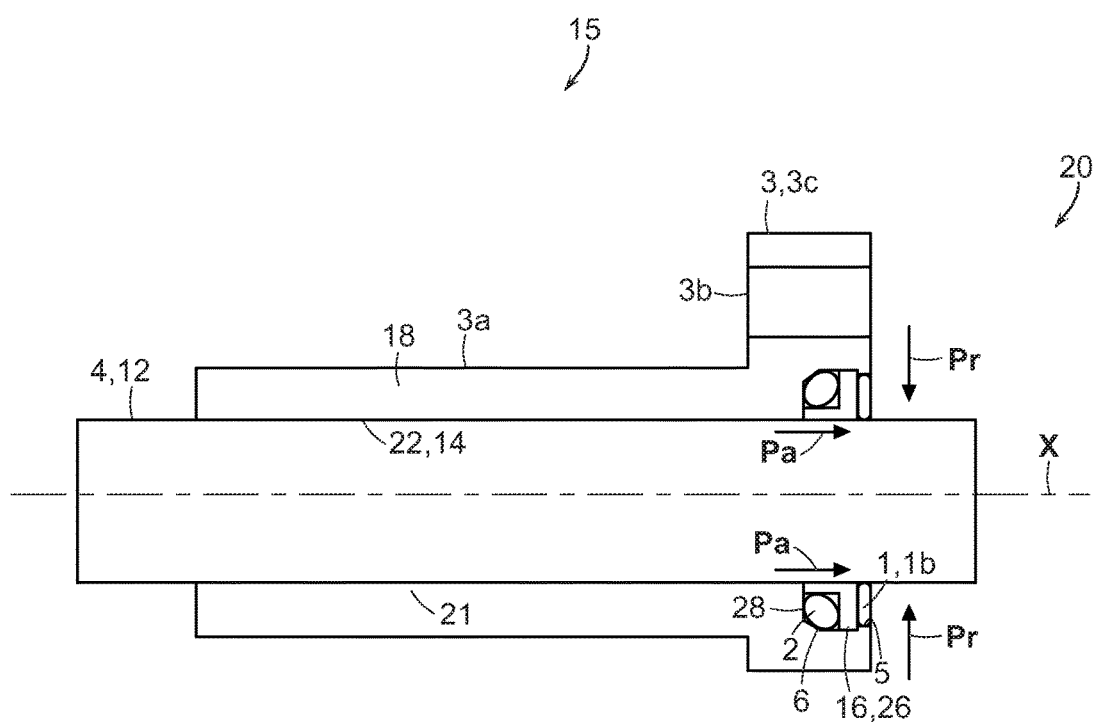
FIG. 14 is a schematic sectional view after insertion.

The lead screw shaft 4 is then inserted into and threaded through nut 18 in the smaller hole 22 of housing 3 of the nut assembly 20. As the lead screw shaft 4 is threaded into the nut 18 and reaches the centralizing ring 1, the end of the lead screw shaft 4 rides through or engages the angled locating ramp 9 and enters hole 30 of the centralizing ring 1, expanding the centralizing ring 1 radially outwardly. The pocket 16 can be sized and shaped so that initially when the O-ring 2 and centralizing ring 1 are positioned within the pocket 16, the angled surface 6 engages the O-ring 2 to a degree where the inner diameter of hole 30 is smaller than the outer diameter of the lead screw shaft 4. As a result, when the lead screw shaft 4 passes through the hole 30, the lead screw shaft 4 exerts a radially outward force $F_1$ against the inner surface 1a of the centralizing ring 1 (FIG. 13). Expansion of the centralizing ring 1 radially outward causes the neck 10 of the centralizing ring 1 to exert a radially outward force $F_2$ that pushes the O-ring 2 radially outward and compresses the O-ring 2 against the shoulder 28 and/or the angled surface 6 and/or the recess 26 of the pocket 16 in a narrowing wedgelike manner. The resilience of the O-ring 2 compressed against the surfaces of the pocket 16 provides resilient axial force or pressure forcing the flange 1b of the centralizer ring 1 axially against internal shoulder 5 of the pocket 16 with axial pressure $P_a$ and resilient radial inward force or pressure forcing the inner surface 1a of the centralizing ring 1 radially concentrically against and around the lead screw shaft 4 with inward radial pressure $P_r$. The inner surface 1a of the centralizing ring 1 can resiliently narrow generally concentrically around the lead screw shaft 4 and axis X, aligning the threads 12 of the lead screw shaft 4 with the threads 14 of the threaded nut 18, and which can align axes X, A, and B along a common axis.

In some embodiments, the centralizing bushing assembly 15 can center a bearing or guide rod through assembly 20 instead of a lead screw shaft 4. In such an embodiment, the smaller size hole 22 can have a linear bushing or bearing instead of a nut 18, for providing sliding of the assembly 20 over the guide rod. In other embodiments, the centralizing bushing assembly 15 can center a spline shaft therethrough, and the smaller size hole 22 can be configured with appropriate features for accepting a sliding spline shaft.

While this invention has been particularly shown and described with references to example embodiments thereof, it will be understood by those skilled in the art that various changes in form and details may be made therein without departing from the scope of the invention encompassed by the appended claims. In some embodiments, the bushing housing 3 can be formed of multiple components combined together.

What is claimed is:

1. A centralizing bushing assembly comprising:
a bushing housing having axial ends and an opening extending therethrough along an axial axis, the opening including a pocket extending outwardly from the axial axis within the bushing housing and having internal shoulders facing each other;
a bushing ring positioned within the pocket of the bushing housing between the internal shoulders, the bushing ring having a split for allowing collapsing of the bushing ring radially inward, an inner diameter for slidably engaging an axially movable shaft extending through the bushing housing along the axial axis, and an outer shoulder; and
a resilient biasing member positioned against the outer shoulder of the bushing ring radially biasing the inner diameter of the bushing ring radially inwardly in a centralizing manner about the axial axis for engaging and centralizing the shaft slidably positioned therethrough.

2. The assembly of claim 1 in which the opening through the bushing housing includes a smaller diameter hole connected to the pocket which has a larger diameter.

3. The assembly of claim 2 in which the resilient biasing member comprises a resilient O-ring.

4. The assembly of claim 3 in which the pocket within the bushing housing has an angled surface which biases the O-ring both radially inwardly and axially, for biasing the inner diameter of the bushing ring radially inwardly, and for biasing the bushing ring axially against one internal shoulder.

5. The assembly of claim 4 further comprising a lead screw shaft extending through the bushing housing and threadably engaging a threaded nut within the smaller diameter hole, the bushing ring resiliently engaging outer surfaces of the lead screw for centering the lead screw relative to the threaded nut for proper contact therebetween and damping noise.

6. The assembly of claim 5 in which the pocket is located at one axial end of the bushing housing.

7. The assembly of claim 1 in which the bushing ring includes a radial flange extending radially outward from the outer shoulder at one axial end of the bushing ring for engaging against said one internal shoulder of the bushing housing.

8. A centralizing lead screw bushing assembly comprising:
a bushing housing having axial ends and an opening extending therethrough along an axial axis, the opening including a pocket extending outwardly from the axial axis within the bushing housing and having internal shoulders facing each other, and a threaded nut axially adjacent to the pocket;
a bushing ring positioned within the pocket of the bushing housing between the internal shoulders, the bushing ring having a split for allowing collapsing of the bushing ring radially inward, an inner diameter for slidably engaging an axially movable lead screw shaft extending through the bushing housing along the axial axis, and an outer shoulder; and
a resilient biasing member positioned against the outer shoulder of the bushing ring radially biasing the inner diameter of the bushing ring radially inwardly in a centralizing manner about the axial axis for engaging and centralizing the lead screw shaft slidably positioned therethrough for centering the lead screw shaft relative to the threaded nut for proper contact therebetween and damping noise.

9. The assembly of claim 8 in which the resilient biasing member comprises a resilient O-ring.

10. The assembly of claim 9 in which the pocket within the bushing housing has an angled surface which biases the O-ring both radially inwardly and axially, for biasing the inner diameter of the bushing ring radially inwardly, and for biasing the bushing ring axially against one internal shoulder.

11. A method of centralizing an axial movable shaft extending within a centralizing bushing assembly, the bushing assembly comprising a bushing housing having axial ends and an opening extending therethrough along an axial axis, the opening including a pocket extending outwardly from the axial axis within the bushing housing and having internal shoulders facing each other, a bushing ring being positioned within the pocket of the bushing housing between the internal shoulders, the bushing ring having a split for collapsing of the bushing ring radially inwardly, an inner diameter and outer shoulder, the method comprising:
slidably engaging the axially movable shaft extending through the bushing housing along the axial axis with the inner diameter of the bushing ring; and
resiliently biasing the inner diameter of the bushing ring radially inwardly against the shaft in a centralizing manner about the axial axis with a resilient biasing member positioned against the outer shoulder of the bushing ring, thereby centralizing the shaft.

12. The method of claim 11 wherein the opening through the bushing housing includes a smaller diameter hole connected to the pocket which has a larger diameter.

13. The method of claim 12 wherein the resilient biasing member comprises a resilient O-ring.

14. The method of claim 13 wherein the pocket within the bushing housing has an angled internal surface, the method further comprising biasing the O-ring both radially inwardly and axially with the angled surface for biasing the inner diameter of the bushing ring radially inwardly and for biasing the bushing ring axially against one internal shoulder.

15. The method of claim 14 wherein the shaft is a lead screw extending through the bushing housing and threadably engaging a threaded nut within the smaller diameter hole, the method further comprising resiliently engaging outer surfaces of the lead screw with the bushing ring for centering the lead screw relative to the threaded nut for proper contact therebetween and damping noise.

16. The method of claim 15 wherein the pocket is located at one axial end of the bushing housing.

17. The method of claim 11 wherein the bushing ring includes a radial flange extending radially outward from the outer shoulder at one axial end of the bushing ring for engaging against said one internal shoulder of the bushing housing.

18. A centralizing bushing device comprising:
a bushing housing having axial ends and an opening extending therethrough along an axial axis, the opening including a pocket extending outwardly from the axial axis within the bushing housing and having internal shoulders facing each other;
a bushing ring for positioning within the pocket of the bushing housing between the internal shoulders, the bushing ring having a split for allowing collapsing of the bushing ring radially inward, an inner diameter for slidably engaging an axially movable shaft extending through the bushing housing along the axial axis, and an outer shoulder; and
a resilient biasing member for positioning against the outer shoulder of the bushing ring for radially biasing the inner diameter of the bushing ring radially inwardly in a centralizing manner about the axial axis for engaging and centralizing the shaft slidably positioned therethrough.

* * * * *